(12) United States Patent
Kaul et al.

(10) Patent No.: US 7,941,655 B1
(45) Date of Patent: May 10, 2011

(54) EXTENSIBLE FIRMWARE INTERFACE WITH PRE-START CONFIGURATION PHASE FOR COMPUTERS

(75) Inventors: Ram Krishan Kaul, Cupertino, CA (US); Terry Ping-Chung Lee, Roseville, CA (US); Dong Wei, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1119 days.

(21) Appl. No.: 11/590,092

(22) Filed: Oct. 31, 2006

(51) Int. Cl.
*G06F 9/00* (2006.01)
*G06F 9/24* (2006.01)
*G06F 15/177* (2006.01)

(52) U.S. Cl. .................................. 713/1; 713/2; 713/100
(58) Field of Classification Search .................. 713/1, 2, 713/100
See application file for complete search history.

(56) References Cited

U.S. PATENT DOCUMENTS

| | | | |
|---|---|---|---|
| 4,700,340 A * | 10/1987 | Beranek et al. | 370/218 |
| 6,512,774 B1 * | 1/2003 | Vepa et al. | 370/401 |
| 6,513,115 B2 * | 1/2003 | Nock et al. | 713/100 |
| 6,976,065 B2 * | 12/2005 | Kaiser et al. | 709/221 |
| 7,080,244 B2 | 7/2006 | Natu et al. | |
| 7,082,523 B2 | 7/2006 | Zimmer et al. | |
| 7,103,641 B2 | 9/2006 | Brannock | |
| 7,237,102 B2 * | 6/2007 | Rothman | 713/1 |
| 7,363,392 B2 * | 4/2008 | Thomas | 710/8 |
| 2002/0174331 A1 * | 11/2002 | Nock et al. | 713/100 |
| 2003/0023895 A1 * | 1/2003 | Sinha et al. | 714/5 |
| 2003/0229685 A1 * | 12/2003 | Twidale et al. | 709/220 |
| 2004/0088531 A1 * | 5/2004 | Rothman | 713/1 |
| 2004/0267708 A1 * | 12/2004 | Rothman et al. | 707/3 |
| 2005/0026486 A1 * | 2/2005 | Thomas | 439/188 |
| 2006/0217103 A1 * | 9/2006 | Velhal et al. | 455/343.3 |
| 2006/0242402 A1 * | 10/2006 | Swift et al. | 713/2 |

* cited by examiner

*Primary Examiner* — Thomas Lee
*Assistant Examiner* — Jaweed A Abbaszadeh

(57) ABSTRACT

A computer system provides an extensible firmware interface with a pre-start configuration phase. This permits configuring a device prior to beginning a start phase for the device.

11 Claims, 1 Drawing Sheet

EXTENSIBLE FIRMWARE INTERFACE WITH PRE-START CONFIGURATION PHASE FOR COMPUTERS

BACKGROUND OF THE INVENTION

Herein, related art is discussed to put the invention in context. Related art labeled "prior art" is admitted prior art; related art not labeled "prior art" is not admitted prior art.

Operating systems serve as an interface between application programs and hardware. As new computer peripherals are developed, drivers for those peripherals can be added to an operating system so that the peripherals can be accessed by any application running on the operating system. However, for any given peripheral, different drivers would be required for different operating systems. This can be a serious problem for large computing systems in which machines running different operating systems must be able to access the same peripherals. For example, in a large data center, servers running different operating systems might have to access the same disk storage arrays. Accordingly, an Extensible Firmware Interface (EFI) has been developed as an interface between operating systems and hardware so that a single driver can be used by several different operating systems.

The extensible firmware interface has two phases that occur during boot up. During a support phase, the devices communicate their capabilities to the EFI. During this phase, drivers stored on the devices can be loaded into the EFI. During the second EFI phase, devices are started using the drivers installed during the first phase. Some devices can be configured, e.g., by writing configuration data to a configuration file read by the device as it starts. Thus, once a device has started, its configuration file can be changed, and the change can take effect by rebooting.

High-availability computing systems employ layers of redundancy to minimize interruptions due to hardware failures. For example, a server might have a reserve host-bus adapter for interfacing with a disk storage array in case a primary host-bus adapter fails. Under some circumstances, the disk array might have to be shut down and reconfigured to recognize the reserve host-bus adapter. For example, the disk array might be configured to recognize only communications from a host-bus adapter with a unique physical port ID (e.g., the world-wide name for the primary host-bus-adapter). To allow the server to access the same disk array via the reserve host-bus adapter would require reconfiguring the disk array to recognize communications with a host-bus adapter with the world-wide name of the reserve host-bus adapter. The present invention addresses the problem of minimizing the interruptions associated with such failovers. Other problems addressed by the present invention are apparent from the description below with reference to the following drawing.

BRIEF DESCRIPTION OF THE DRAWINGS

The following drawing is of embodiments/implementations of the invention and not of the invention itself.

DETAILED DESCRIPTION

Figure 1:
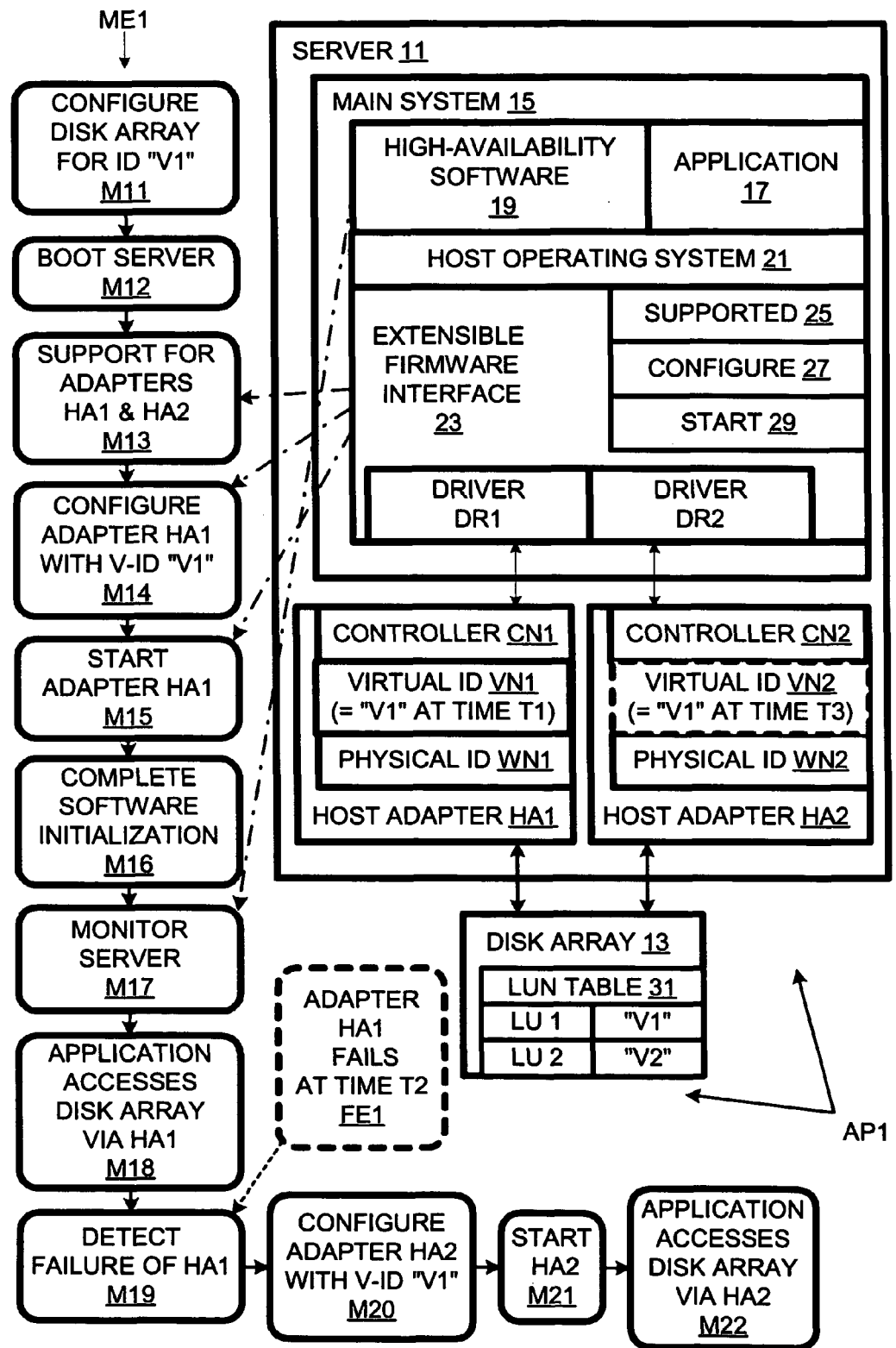
FIG. 1 is a hybrid schematic diagram and flow chart in accordance with embodiments of the invention.

The present invention provides for pre-start configuration in an EFI boot sequence. Since configuration occurs prior to device start, no reboot is required to implement the new configuration. This can make it possible to boot a system even when the default or most-recent configuration is incompatible with the incorporating system or platform. In addition, the omission of the reboot can save valuable time, especially when a replacement computer system is being activated in response to failure of a computer system running a mission-critical workload in a high-availability context.

A storage area network AP1 includes plural servers and disk arrays, with a representative server 11 and a representative disk array 13 shown in FIG. 1. Server 11 includes a main system 15 and input-output devices including host adapters (e.g., host-bus adapters) HA1 and HA2. Main system 15 includes processors and memory. Adapters HA1 and HA2 provide a redundant interface between main system 15 and disk array 13.

Main system 15 runs software including an application 17 (e.g., database, web server) and high-availability software 19 that monitors the health of server 11 and takes action to address problems such as failed hardware. These programs run on a host operating system 21. An extensible firmware interface 23 provides a standardized interface between host operating system 21 and the hardware of main system 15. Extensible firmware interface 23 has three phases, "supported" 25, "configure" 27, and "start" 29. In addition, extensible firmware interface 23 includes drivers for various devices including driver DR1 for host adapter HA1 and driver DR2 for host adapter HA2.

Host adapter HA1 provides for physical and electrical connectivity with disk array 13 via network appliances of storage array network AP1. Host adapter HA1 includes a controller CN1 for managing communications with main system 15 and disk array 13. Host adapter HA1 has a unique physical identity WN1 in the form of a world-wide name Host adapter HA1 can be configured with a virtual identity VN1; in the illustrated case, at time T1, host adapter HA1 has been configured to have a virtual identity "V1". Unlike physical identity WN1, virtual identity VN1 can be changed, e.g., by changing a configuration file and restarting host adapter HA1. Similarly, host adapter HA2 includes controller CN2, a unique physical identity WN2, and a configurable virtual identity VN2. However, host adapter HA2 is idle and its virtual identity VN2 is unassigned at the time T1.

Disk array 13 includes plural hard disks collectively divided into logical units (LUNs). Each logical unit is separately configured. In FIG. 1, two logical units LU1 and LU2 are indicated in FIG. 1. As indicated in LUN table 31, logical unit LU1 is configured to only accept communications from virtual ID V1, while logical unit LU2 is configured to only accept communications from virtual ID V2. At time T1, host adapter HA1 is the owner of virtual identity V1, while the owner of virtual identity V2 is not shown.

The present invention provides for a method ME1 to be used in the context of storage area network AP1. At method segment M11, one or more disk arrays are configured to communicate with a device having a selected virtual identity, e.g., "V1". In this case, identity "V1" is assigned to logical unit LU1 of disk array 13. In addition, another identity "V2" is assigned to logical unit LU2 of disk array 13.

At method segment M12, server 11 is booted. Method segment corresponds to the EFI boot supported phase. During boot-up, extensible firmware interface 23 interacts with devices including host adapters HA1 and HA2 to load drivers therefrom, and to determine their capabilities and requirements. Drivers DR1 and DR2 are copied from respective host adapters HA1 and HA2 and installed with extensible firmware interface 23 at method segment M13

At method segment M14, host adapter HA1 is configured with a virtual identity "V1", corresponding to the virtual identity assigned to logical unit LU1 of disk array 13. No configuration of host adapter HA2 is performed at this phase. At method segment M15, host adapter HA1 is started, but host adapter HA2 is left idle.

At method segment M16, software initialization is completed. Host operating system 21 is fully loaded and initialized, as are application 17 and high-availability software 19. At method segment M17, high-availability software 19 begins monitoring of server 11, including adapters HA1 and HA2. At method segment M18, application 17 runs and accesses LUN LU1 of disk array 13 for storing and fetching data.

While application 17 is running and while high-availability software 19 is monitoring, host adapter HA1 fails at time T2 as indicated at FE1 in FIG. 1. This failure is detected by high-availability software 19 at method segment M19. While virtual identities must be unique, at least within a network, virtual identity V1 has become available due to the failure of host adapter HA1. Accordingly, high availability software 19 configures host adapter HA2 via extensible firmware interface 23 with virtual identity "V1" at time T3 at method segment M20. Host adapter HA2 is started at method segment M21. Subsequently, application 17 accesses logical unit LU1 of disk array 13 via host adapter HA2, at method segment M22.

From the perspective of application 17, all that has occurred is a brief interruption in the availability of disk array 13. Extensible firmware interface 23 handles the switchover from host adapter HA1 to host adapter HA2 so that it is invisible to application 17. From the perspective of disk array 13, all that has occurred is a brief period of inactivity or unavailability of a device with identity "V1". Disk array 13 cannot detect that the identity it is responding to has moved from one host adapter to another. There is no need to reconfigure disk array 13 so that application 17 can continue accessing logical unit LU1. Thus, the failure of host adapter HA1 is handled without having to reconfigure disk array 13 or having to reboot server 11.

Server 11 can be set up to handle the specific failure described above in another way. For example, LUN LU2 can mirror LUN LU1. LUN LU1 can be assigned to the physical ID of host adapter HA1 and LUN LU2 can be assigned to the physical ID of host adapter HA2. Alternatively, LUN LU1 and LU2 can be assigned to different virtual identities, e.g., V1 and V2, assigned respectively to host adapters HA1 and HA2. In the event, host adapter HA1 fails, application 17 can access mirrored data on LUN LU2 via host adapter HA2.

The approach of the present invention is more flexible and more scalable than this mirrored data approach. For example, if after host adapter HA1 fails, host adapter HA2 fails, the virtual identity V1 can be transferred to a third host adapter. Also, if server 11 fails, application 17 and virtual identity V1 can be migrated to another server on the storage area network AP1.

Also, it is generally not cost effective to maintain reserve hardware on a 1:1 basis with active hardware. More typically, one or two reserve devices can serve as back up for several active devices. The present invention allows a reserve device to assume the identity of whichever of several alternative active devices fails.

The present invention is made possible by implementing a change to the driver connection sequence to provide for "pre-start" configuration phase 27. This configuration phase 27 can be implemented on platforms where the added value of such configuration warrants platform firmware change. EFI drivers that participate in the "pre-start" configuration phase are required to support a new entry point called "Configure( )". This entry point can be registered in the "EFI_DRIVER_BINDING_PROTOCOL" and made known to the platform EFI firmware.

Platform EFI firmware participating in the "pre-start" configuration phase can then call the "Configure( )" entry point registered via EFI_DRIVER_BINDING_PROTOCOL after "Supported( )" has returned EFI_SUCCESS to perform the necessary configuration actions. This entry point can be called after "Supported( )" but before "Start( )". If an EFI driver instance returns EFI_SUCCESS for "Supported( ), "Configure( )" would be called to configure the EFI driver and supported HBA or other device. On those platforms where "Configure" has not been implemented, this phase would be skipped.

"Configure( )" must not be called for a controller for which the EFI driver returned anything other than EFI_SUCCESS. If "Configure( )" is called for a Controller which the EFI driver does not support, EFI_UNSUPPORTED must be returned.

Pre-Start Configure is different from EFI_DRIVER_CONFIGURATION_PROTOCOL because it is a "programmatic" way to configure controller attributes. This interface does not provide any interactive way to configure controllers. The pre-start "Configure( )" phase must be used when the configurations are required before the EFI driver is started via its Start( ) routine. For configurations needed after the EFI driver is started, EFI_DRIVER_CONFIGURATION_PROTCOL can be used.

EFI_DRIVER_BINDING_PROTOCOL with "Configure( )" entry point prototype is described below.

Protocol Interface Structure:

Typedef struct_EFI_DRIVER_BINDING_PROTOCOL {
    EFI_DRIVER_BINDING_PROTOCOL_SUPPORTED Supported;
    EFI_DRIVER_BINDING_PROTOCOL_START Start;
    EFI_DRIVER_BINDING_PROTOCOL_STOP Stop;
    UINT32 Version;
    EFI_HANDLE ImageHandle;
    EFI_HANDLE DriverBindingHandle;
    EFI_DRIVER_BINDING_PROTOCOL_CONFIGURE Configure;
} EFI_DRIVER_BINDING_PROTOCOL;

TABLE I

| Parameters | |
|---|---|
| Supported | Same as in UEFI V2.0 specification |
| Start | |
| Stop | |
| ImageHandle | |
| DriverBindingHandle | |
| Configure | deposits configuration parameters for this controller with the EFI driver. These parameters must be used to initialize the controller in succeeding Start( ). |
| Version | Version of the EFI_DRIVER_BINDING_PROTOCOL. The version for this protocol is "2". |

EFI_DRIVER_BINDING_PROTOCOL.Configure( ) deposits platform or hardware specific parameters with the EFI driver which must be used to initialize the controller in the succeeding "Start( )" invocation. An example follows.

```
Typedef
EFI_STATUS
(EFIAPI *EFI_DRIVER_BINDING_PROTOCOL_CONFIGURE) (
 IN    EFI_DRIVER_BINDING_PROTOCOL   This
 IN    EFI_HANDLE                    ControllerHandle
 IN    EFI_DEVICE_PATH_PROTOCOL      RemainingDevicePath
 IN    EFI_GUID                      ProtocolGuid
 IN    VOID                          ParameterBlock
 OUT
);
```

The parameters used above are described below.

"This" is a pointer to the EFI_DRIVER_BINDING_PROTOCOL Instance.

"ControllerHandle" is the handle of the controller to which the configuration parameters are applicable. It must be the same ControllerHandle for which EFI_SUCCESS was returned in the preceding "Supported( )" call.

"RemainingDevicePath OPTIONAL" is an optional argument. If the protocol represented by the ProtocolGuid applies to a device then RemainingDevicePath points to the EFI device path of that device.

"ProtocolGuid" is the GUID of the protocol to which the parameters are applicable to. EFI drivers must check the protocol GUID to see if they support configuration for the defined protocol. If the GUID does not correspond to a supported protocol by the driver, it must return EFI_UNSUPPORTED. If the driver supports the protocol, then the next parameter is decoded based on protocol.

"ParameterBlock" is a pointer to a ParameterBlock Structure which contains details about the configuration parameters specific to the protocol represented by ProtocolGuid. This structure is defined based on the protocol and may be different for different protocols. EFI driver decodes this structure and its contents based on the protocol represented by ProtocolGuid.

The present invention allows the EFI system firmware to provide system or hardware specific parameters about the controller to the EFI driver. The EFI driver is supposed to use these parameters to initialize the controller in the "Start( )" routine. These parameters might be critical to the platform functioning or they might simply provide added performance boot as a value add service. If the EFI driver supports the configuration protocol and the particular version of the protocol, it decides the parameter block structure and stores the parameter values therein in local data structures. These cached values are used in the succeeding "Start( )" routine to initialize the controller.

When "Configure( )" has been completed successfully, the EFI driver is mandated to use the deposited parameters to initialize the controller. In the absence of the configure phase in the driver connection sequence, the EFI driver can continue to use default or persistently stored values for these parameters. This function must not change the state of any hardware devices, and this function must be aware that the device specified by ControllerHandle may already be managed by the same driver or a different driver. This function must match its calls to AllocatePages( ) with FreePages( ), AllocatePool( ) with FreePool( ) and OpenProtocol( ) with CloseProtocol( ). Since ControllerHandle may have been previously started by the same driver, if a protocol is already in the opened state, then it must not be closed with CloseProtocol( ). This is required to guarantee the state of ControllerHandle is not modified by this function.

If any of the protocol interfaces on the device specified by ControllerHandle that are required by the driver specified by This are already open for exclusive access by a different driver or application, then EFI_ACCESS_DENIED is returned. If any of the protocol interfaces on the device specified by ControllerHandle that are required by the driver specified by This are already opened by the same driver, then EFI_ALREADY_STARTED is returned. However, if the driver specified by This is a bus driver that is able to create one child handle at a time, then it is not an error, and the bus driver should continue with its test of ControllerHandle. This allows a bus driver to create one child handle on the first call to Supported( ) and Start( ), and create additional child handles on additional calls to Supported( ) and Start( ).

Since EFI drivers do not touch underlying hardware during configuration phase they are not supposed to write the configuration data during this phase. If the configuration data needs to be stored persistently it must be cached during Configure( ) and committed during Start( ) or later. The system firmware may call the EFI driver to first get a list of supported configuration GUIDs. This is supported by a mandatory configuration protocol GUID which EFI drivers must support if they provide support for "Configure( )".

If the EFI driver does not support the controller represented by ControllerHandle EFI_UNSUPPORTED must be returned. If the EFI driver does not support the configuration protocol represented by ProtocolGuid, EFI_UNSUPPORTED must be returned. If EFI driver does not support the configuration protocol version represented by ProtocolVersion, EFI_UNSUPPORTED must be returned.

TABLE II

| Status Codes Returned | |
|---|---|
| EFI_SUCCESS | indicates the EFI driver supports the configuration protocol and the specific version of the protocol. Parameter values have been cached locally. |
| EFI_UNSUPPORTED | 1. indicates the configuration protocol is not supported.<br>2. indicates that the configuration protocol version is not supported.<br>3. indicates the configuration cannot be performed.<br>4. indicates the configuration cannot be performed. |
| EFI_UNSUPPORTED_PARAMETER | indicates that the parameter block pointer is NULL |
| EFI_BUFFER_TOO_SMALL | indicates the buffer is too small to return all the supported GUID's. in ReturnBuffer. |
| EFI_ALREADY_STARTED | indicates when any of the protocols required by the driver are already opened by the driver. |

The "Configure( )" interface can be used for multiple protocols. The following protocol is defined for initial usage. Additional protocols can be added when a need for them is envisioned. It is important to define the "ParameterBlock" along with the protocol.

```
GUID
# define EFI_CONFIGURE_GET_PROTOCOL_LIST_
    GUID\ {0xb0908933, 0x2843, 0x486d, 0xb4, 0x35,
    0x5f, 0x1e, 0x6e, 0xe3, 0xa2, 0x90)
Typedef          struct_EFI_CONFIGURE_GET_PROTO-
COL_LIST_BLK {
    IN OUT UINTN *BufferSize;
    IN OUT UINTN *ReturnBuffer;
} EFI_CONFIGURE_GET_PROTOCOL_LIST_BLK;
```

BufferSize on input contains the size of the buffer passed in ReturnBuffer. On output it may contain the size required by the EFI drivers to return all the protocol GUID's supported by it if the passed in size was not enough.

ReturnBuffer on input contains a pointer to the memory location where the list of protocol GUID's must be stored. On Output it contains the list of GUID's supported by the EFI driver if the buffer passed in was big enough to return the whole list.

All EFI drivers that support "Configure( )" must support this protocol GUID.

```
GUID
#define  EFI_CONFIGURE_CLP_PROTOCOL_GUID\
   {0x345ecc0e, 0xcb6, 0x4b75, 0xbb, 0x57, 0x1b, 0x12,
   0x9c, 0x47, 0x33, 0x3e)
Typedef       struct_EFI_CONFIGURE_CLP_PARAM-
ETER_BLK {
   IN CHAR *CLPCommand;
   OUT CHAR8 *CLPReturnString;
   OUT UINT8 CLPCmdStatus;
   OUT UINT8 *CLPErrorValue;
   OUT UINT8 *CLPMsgCode;
} EFI_CONFIGURE_CLP_PARAMETER_BLK;
```

TABLE III

| | Structure Member Definitions |
|---|---|
| CLPCommand | A pointer to the DMTF SM CLP command line null-terminated string that the driver is required to parse and process when this function is called. |
| CLPReturnString | A pointer to the CLP return status string that the driver is required to provide to the calling agent. |
| CLPReturnStatus | SM CLP Command Status (see DMTF SM CLP Specification—Table 5) |
| CLPErrorValue | M CLP Processing Error Value (see DMTF SM CLP Specification—Table 7) |
| CLPMessageCode | Bit 15: OEM Message Code Flag<br>0 = Message Code is an SM CLP Probable Cause Value<br>(see SM CLP Specification Table 12)<br>1 = Message Code is OEM Specific<br>Bits 14-0: Message Code |

CLPCommand A pointer to the DMTF SM CLP command line null-terminated string that the driver is required to parse and process when this function is called. See the DMTF SM CLP Specification for details on the format and syntax of the CLP command line string.

CLPReturn String A pointer to the CLP return status string that the driver is required to provide to the calling agent. The calling agent may parse and/or pass this for processing and user feedback. See the DMTF SM CLP Specification for details on the format of the CLP command line string. The SM CLP Command Response string buffer is filled in by the EFI driver in the "keyword=value" format described in the SM CLP Specification (see section 3.1.10, "Output Data"), unless otherwise requested via the SM CLP-output option in the Command Line string buffer. EFI driver's support for this default "keyword=value" output format is required if the EFI driver supports this protocol, while support for other SM CLP output formats is optional. (The EFI Driver should return an EFI_UNSUPPORTED if the SM CLP-output option requested by the caller is not supported by the EFI Driver).

A provision for "pre-start" configuration phase can allow system-specific or HBA-specific parameters to be passed to the EFI driver allowing it to be configured in a vendor unique fashion. The exact parameters to be configured, their syntax and semantics can provide vendor unique value add to the solution. This configuration phase removes the need for manual configuration of these parameters via EFI shell and eliminates the need for restarting the EFI drivers and underlying hardware. Since configuration parameters are specific to a protocol which both EFI driver and platform firmware must understand, it is extensible to other protocols in the future whenever they are defined.

This pre-start configure phase is also extensible in the sense that it allows for vendors to define their own sub-set of parameters for a given protocol, thus providing unique value adds to their solutions. The pre-start configuration phase is intended to be backwards compatible because it does not force either the EFI drivers or the platform firmware to support it, if it is not required. It also works if one of them supports it and the other does not. For example if platform firmware supports "Configure( )" but the underlying EFI drive does not or if EFI driver supports it but the platform firmware does not. This allows EFI driver writers to have a single EFI driver binary for all types of EFI platforms regardless of whether they support and utilize "Configure( )" or not.

As used herein, a "firmware interface" is a layer between computer hardware and an operating system. Generally, the firmware interface is compatible with different operating system so that device drivers hosted by the firmware interface are compatible with those different operating systems. A firmware is "extensible" if it accepts new drivers to accommodate new hardware. "Extensible Firmware Interface" refers to the particular extensible firmware interface promulgated by the Unified EFI Forum.

The present invention provide for phase-locked firmware interfaces and non-phase-locked firmware interfaces. In a phase-locked firmware interface, one phase must be completed for all devices before any device can be started. In other words, once the start phase begins for any device, the opportunity for a pre-start configuration of any other device is gone until a reboot. In a non-phase locked firmware interface, one device can enter its start phase, while another device remains in the pres-start configuration phase. This allows one device to be configured after the failure of another, as the illustrated method.

The present invention can apply to a variety of device types, including host bus adapters, printer ports, sensor ports, communications ports, etc. The present invention can apply to single server systems as well as to multi-server systems. In the latter case, devices on one server can serve as backup to devices on other servers. These and other variations upon and modifications to the embodiments described above are provided for by the present invention, the scope of which is defined by the following claims.

What is claimed is:

1. A system comprising:
hardware for running an application;
first and second hardware interface devices through which said application can access at least part of an external device;
an extensible firmware interface (EFI) providing for configuring said second interface device with a first virtual identity without a reboot after said application has accessed said at least part of said external device via said first interface device while said first interface device was configured with said first virtual identity.

2. A system as recited in claim 1 wherein said EFI provides for managing respective first and second device drivers for said first and second interface devices, said EFI defining
a support phase for recognizing said first and second interfaces-devices as supported devices;

for each of said interface devices, a respective pre-start configuration phase during which the respective interface device can be configured with said first virtual identity;

for each of said interface devices, a respective start phase for starting the respective one of said interface devices, said EFI providing for configuring said second interface device with said first virtual identity during the pre-start configuration phase for said second interface device after said first interface device has begun its respective start phase configured with said first virtual identity.

3. A system as recited in claim 2 wherein said system provides for detection a failure of said first interface device, said second interface being configured with said first virtual identity after said detection.

4. A system as recited in claim 2 wherein said first and second interface devices are host bus adapters and said part of an external device is a logical unit of a disk array, said logic unit being configured to accept communications only from a device with said first virtual identity.

5. A method comprising:
starting a server having an extensible firmware interface (EFI) and first and second interface devices so that said EFI configures said first interface device with a first virtual identity;
starting said first interface device as configured with said first virtual identity; and
subsequent to said starting said first interface, said EFI configuring a second interface device with said first virtual identity without rebooting said server.

6. A method as recited in claim 5 further comprising after said starting said first interface device and before configuring said second interface device, detecting a failure of said first interface device, said configuring said second interface device being in response to said detecting.

7. A method as recited in claim 5 further comprising configuring at least part of an external device so that it can only be accessed by said server via an interface device configured with said first virtual identity.

8. A method as recited in claim 5 further comprising executing a pre-start configuration phase of an extensible firmware interface (EFI) for said first interface device so as to configure it with said first virtual identity, said starting said server involving executing a support phase of said EFI so as to recognize said first and second interface devices, said starting said first interface device involving executing a start phase of said EFI for said first interface device, said configuring said second interface device occurring during a pre-start configuration phase of said EFI for said second interface device.

9. A method as recited in claim 8 wherein said first and second interfaces are host-bus adapters and said at least part of an external device is a logical unit of a disk array, said logical array being configured to accept communications only from a device having said first virtual identity.

10. A product comprising non-transitory computer-readable storage media encoded with extensible firmware interface (EFI) code that, when executed by a processor, provides for:
a support phase for recognizing supported devices including first and second interface devices;
a pre-start configuration phase for each of said supported devices for configuring the respective device; and
a start phase for each of said supported devices that provides for starting the respective supported device so that it can be used by application software;
said EFI code providing for configuring said second interface device with a first virtual identity during a pre-start configuration phase for said second interface device after said first interface has been i) configured with said first virtual identity, ii) started, and iii) used by said application software to access at least part of an external device.

11. A product as recited in claim 10 wherein said first and second interface devices are host bus adapters and said part of an external device is a logical unit (LUN) of a disk array, said logical unit being configured to accept communication from a device having said first virtual identity.

* * * * *

UNITED STATES PATENT AND TRADEMARK OFFICE
CERTIFICATE OF CORRECTION

PATENT NO. : 7,941,655 B1
APPLICATION NO. : 11/590092
DATED : May 10, 2011
INVENTOR(S) : Ram Krishan Kaul et al.

It is certified that error appears in the above-identified patent and that said Letters Patent is hereby corrected as shown below:

In column 8, lines 66-67, in Claim 2, delete "interfaces-devices" and insert
-- interface devices --, therefor.

Signed and Sealed this
Third Day of January, 2012

David J. Kappos
*Director of the United States Patent and Trademark Office*